United States Patent [19]
Wilkerson

[11] 4,426,414
[45] Jan. 17, 1984

[54] LAMINATED NON-WOVEN FABRIC

[75] Inventor: Forrest W. Wilkerson, Ashville, N.C.

[73] Assignee: Beacon Manufacturing Company, Swannanoa, N.C.

[21] Appl. No.: 416,032

[22] Filed: Sep. 8, 1982

[51] Int. Cl.³ .............................................. B32B 3/06
[52] U.S. Cl. ...................................... 428/102; 28/112; 66/191; 66/192; 112/420; 428/284; 428/294; 428/300
[58] Field of Search ............... 428/314.4, 314.8, 316.6, 428/317.9, 304.4, 102, 284, 286, 298, 299, 300, 294, 295; 156/148; 28/107, 112; 112/420; 66/191, 192

[56] References Cited

U.S. PATENT DOCUMENTS

| | | | |
|---|---|---|---|
| 3,260,640 | 7/1966 | Owen | 428/102 |
| 3,274,806 | 9/1966 | Duhl | 428/102 |
| 3,329,552 | 7/1967 | Hughes | 428/91 |
| 3,337,387 | 8/1967 | Owen | 428/91 |
| 3,392,078 | 7/1968 | Duhl | 428/102 |
| 3,451,885 | 6/1969 | Klein | 428/311.1 |
| 3,506,529 | 4/1970 | Sanders | 428/92 |
| 3,600,261 | 8/1971 | Kerres | 428/90 |
| 3,635,785 | 1/1972 | Hughes | 428/102 |
| 3,635,786 | 1/1972 | Hughes | 428/102 |
| 3,649,428 | 3/1972 | Hughes | 428/102 |
| 3,649,429 | 3/1972 | Hughes | 428/102 |
| 3,998,986 | 12/1976 | Williams | 428/102 |
| 4,051,288 | 9/1977 | Wilson et al. | 428/102 |
| 4,170,676 | 10/1979 | Thomas | 428/300 |
| 4,183,985 | 1/1980 | Lemieux | 428/300 |

Primary Examiner—James J. Bell
Attorney, Agent, or Firm—Abelman, Frayne & Rezac

[57] ABSTRACT

A laminated non-woven fabric having a stitched core of cellular sheet material and facings of fiber batting needled through the core and partially into the opposite facing, the fibers in the facings dominantly extending transversely to the stitching of the core.

18 Claims, 4 Drawing Figures

LAMINATED NON-WOVEN FABRIC

FIELD OF THE INVENTION

This invention relates to a non-woven fabric. While not limited thereto, the non-woven fabric of the present invention is of particular utility as a bedding blanket, coverlet or the like, or for use in the manufacture of articles of apparel.

In addition to being of particular utility in domestic or commercial blankets, in which it is essential that the blanket be of pleasing aesthetic appearance and hand, the invention also finds particular utility in hospital blankets and the like in which it is essential that shedding, fuzzing, or pilling of the blanket be minimized without in any way affecting the launderability of the blanket.

The non-woven fabric of the invention, in addition to being of particular utility in standard weight blankets, also finds particular utility in featherweight or summerweight blankets, it being possible to fabricate such blankets to weight, thermal insulation, and heat retention specifications closely approximating those of cellular or honeycomb blankets while avoiding the necessity of weaving or knitting the blanket material.

Additionally, the invention relates to a non-woven fabric of enhanced heat retentivity and thermal insulation properties for a given weight of fabric per unit area, and which can be of lightweight construction while at the same time being of high dimensional stability, even after repeated washings.

BACKGROUND OF THE INVENTION

Non-woven fabrics, including those useable as bedding blankets are well known in the art and various constructions have had wide consumer acceptance. However, many of these products have undesirable surface characteristics or poor wear life characteristics.

An example of a non-woven fabric is found in U.S. Pat. No. 3,506,529, to Sanders, issued Apr. 14, 1970, which discloses a fabric with a substrate of foamed plastics material and facings of randomly oriented fibrous material which have been needled through both the substrate and each opposite side facing. This structure exhibits a surface texture of somewhat pimpled appearance due to the projection beyond the surface of the fabric of compacted fibers which have been displaced through the facing by the needling of the fibers from the opposite face. These fibers extend substantially perpendicular to the fabric, and form clumps of fibers or pimples on the facing surface, which do not disappear even after subsequent brushing or napping operations.

In many prior constructions the dimensional stability of the fabric is achieved, at least in part, from the substrate combined with relatively bulky fabrics; however, such combinations precluded the formation of lightweight blanket constructions.

It has been suggested that strength can be achieved by reinforcement of the substrate. For example, U.S. Pat. No. 3,329,552 to Hughes, issued July 4, 1967 discloses the addition of stitching to a non-woven fibrous core and the use of the core as a substrate in a needle-loomed blanket material. While providing strength, the core must be made relatively bulky if it is to have desirable thermal properties.

It has also been suggested that a stitching reinforcement can be applied to foam material. For example, in U.S. Pat. No. 4,051,228, to Wilson et. al, issued Sept. 27, 1977, dimensional stabilization of foamed plastics sheet material in one longitudinal direction is achieved by longitudinally stitching the material while it is under tension. This submerges the stitches in the foam and reinforces it. However, the foam so constructed is not readily suitable for a blanket construction.

SUMMARY OF THE INVENTIVE CONCEPT

According to the present invention, a dimensionally stable non-woven fabric of enhanced thermal properties and of enhanced hand and drape is provided, which includes a core of a cellular sheet material, preferably a closed-cell cellular sheet material, which is reinforced and dimensionally stabilized in one direction by reinforcing elements associated therewith, and at least one facing of non-woven material needle-loomed through the core to a depth sufficient to terminate within the opposite facing but below the outer surface thereof.

The cellular sheet material may be formed of any suitable material, such as chemically foamed or aerated plastics material, foamed rubber, or a non-hardening cellulose sponge material.

Conveniently, the reinforcing elements are applied to the cellular sheet material by mechanical stitching or chemically. Where the cellular sheet material is a foamed thermoplastics material, the reinforcing elements can be formed by dielectric or sonic fusing of the foamed plastics material under pressure to collapse lines of cells and fuse the material forming the cells into reinforcing strands. Alternatively, the reinforcement elements can be filaments which have been incorporated into the cellular sheet material during the manufacture thereof by the inisitu forming of the cellular sheet material around the filaments, or, they can be filaments which have been bonded to one or both faces of the cellular sheet material subsequent to the formation thereof.

After the reinforcement of the cellular core, facings are applied to form a laminate. At least one of the facings is a fiber batting in which the fibers are oriented in a general direction transverse to the direction of the reinforcing elements. Preferably, the fibers are also oriented at acute angles to each other in order to facilitate subsequent tentering of the finished laminate and to promote stabilization of the fabric in direction transverse to the first direction.

A needling loom transfers fibers from the batting facing through the cellular core and into the opposite facing. The depth of the needling is selected to terminate within the thickness of the opposite face without extending to and beyond the exposed surface of such opposite facing. In a bedding blanket, preferably both facings are formed of fiber batting, and the laminate is needled, preferably simultaneously from both sides thereof in a manner such that the needling from each side terminates within the opposite facing.

By terminating the needling within the opposite facing, pimpling on the surface of the respective facings is eliminated. The only discontinuities in the surface of the respective facings are minor surface irregularities, which can easily be masked by subsequent brushing, raising or napping the surfaces of the laminate. The individual fibers in the facings are held securely within the fabric as a consequence of the needling operation and effectively resist shedding or fuzzing of the fabric. Due to the fact that the nap on the fabric is of low pile and is comprised dominantly of the raised free ends of relatively long staple fibers which are otherwise firmly anchored in the fabric, there is little opportunity for pilling of the fabric during use, laundering, or dry cleaning.

Either prior to the brushing or napping of the formed fabric, or subsequent thereto, or intermediate to multiple brushing or napping operations, the fabric is tentered in a direction lateral to the direction of the reinforcing elements. This stresses the fibers in the facings and draws the fibers into closer alignment with each other in a direction lateral to the reinforcing elements. This, in turn, progressively enhances the resistance to further stretching of the fabric in a lateral direction, and enhances the dimensional stability of the fabric in the direction of the tentering. The tentering imposes no appreciable restriction on stretchability or "give" of the fabric in the bias direction, so a highly desirable flexibility and hand is provided.

Preferably, the fibers of the facings are laid dominantly at acute angles relatively to each other, with the general direction of the fibers being lateral to the direction of the reinforcing elements. In this manner, when the fabric is tentered the individual fibers are drawn more closely into alignment with each other, and there is an enhancement of the dimensional stability of the fabric in the lateral direction.

The needling operation establishes openings through the cellular sheet material providing pathways through the core for the passage of air, and vapor transmission between the respective faces of the fabric through capillarity along the fiber lengths. Without regard to whether the cellular sheet material is formed from a hydrophilic or a hydrophobic material, pathways are established for the movement of moisture and air between the respective faces of the fabric, while at the same time, the cells of the cellular sheet material decrease the rate of thermal transmission between the respective faces.

DESCRIPTION OF THE DRAWINGS

The invention will now be described with reference to the accompanying drawings, which are illustrative of a preferred construction and manner of manufacture of the non-woven fabric of the present invention, and in which;

Referring now to the drawings, FIG. 1 shows the laminated non-woven fabric of the invention at 10, the fabric including a core of a cellular sheet material 11. While not limited thereto, the core may be a thin-gauge sheet of peeled polyurethane foam material having a thickness in the order of 0.0025 inches. Sheeting of this type is manufactured by W. T. Burnett & Co. under the trade name Unifoam S82F. The sheeting is highly resistive to spontaneous ignition and is formed by peeling foamed slab-bonded urethane. Other materials, particularly a flexible foamed polyester material may be employed in substitution for foamed polyurethane in order to provide a laminate of enhanced flame resistance. Optionally, foamed rubber sheeting or non-hardening cellulose sponge sheeting may be employed as the core, either in combination with or in substitution for sheeting of foamed plastics material. Additionally, the foamed material may incorporate fire retardant or suppressant agents, preferably agents which are resistive to leaching in the subsequent laundering or dry-cleaning operations to which the fabric is expected to be subjected.

Figure 1:
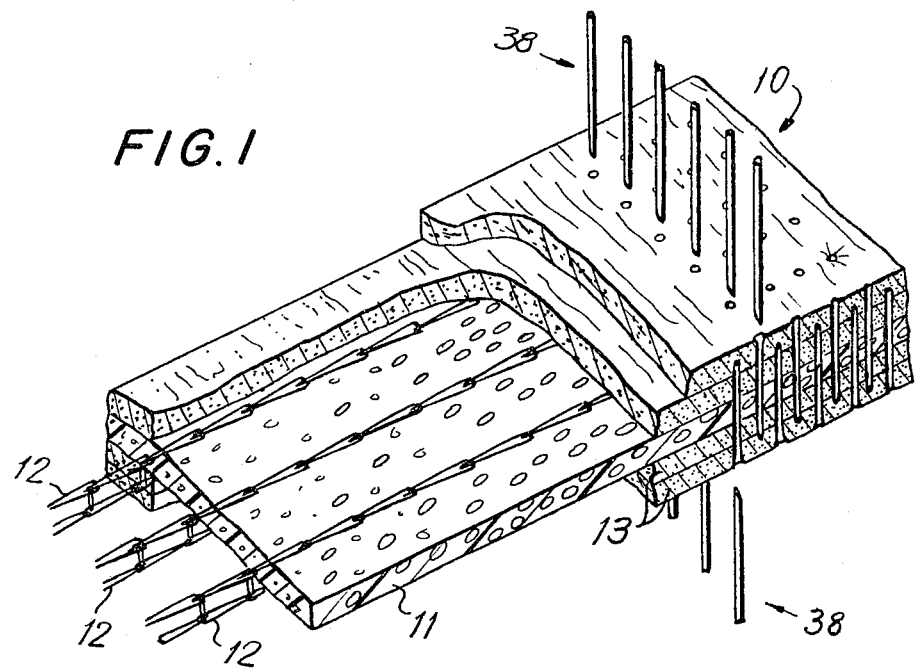
FIG. 1 is a fragmentary perspective view of one form of non-woven fabric according to the present invention in its various stages of manufacture.

The initially formed bulk foamed material is of closed-cell construction, and preferably remains so to the greatest possible extent, even after the peeling operation. While in the peeling operation a number of the closed-cells are partially severed and opened, the severing and partial opening of those cells will leave intact a closed honeycomb structure providing dead-air pockets within the confines of the core. Preferably in the formation of the foamed material for the sheeting the cell size of the individual cells is maintained below a determined maximum, and, a preponderance of the cells are of smaller size and extent than the size of the largest of the cells.

The core could also be a sheet of a suitable foamed thermosetting material, or foamed rubber sheeting, or, non-hardening cellulose sponge sheeting, provided that the core include either closed or partially closed dead-air cells and pockets, and, that it be only partially permeable to the flow of air therethrough.

The extremely thin foamed core material is then reinforced so it may serve as a stablizing force for the finished fabric, and so it may be readily handled during the processing of the fabric through a needle loom. Preferably, the cellular sheet material is stitched at laterally spaced intervals in a direction extending longitudinally thereof. Conveniently, rows of stitching at intervals of 0.25 inches are formed by a conventional tandem needle stitching machine.

Preferably, the stitching is chain stitching 12, which is effected at a rate of three stitches per inch using nylon monofilament having a diameter in the range of 0.02 to 0.025 inches. Multi-filament thread can be substituted for a nylon monofilament thread such as a multi-filament thread having twisted or untwisted loosely bunched monofilament threads. While nylon is preferred as the thread material, other materials may be employed, such as polyester, cotton, or admixtures thereof.

Dimensional stabilization of the cellular core in a longitudinal direction, may be accomplished by other means. Chemical stitching may be employed in which strands of thermosetting or chemically setting plastics material are fed onto and self-bonded to the surface of the core sheet from spinnerettes or the like. Alternatively, continuous threads can be adhesively bonded to one or both sides of the core, or, in the event that the core is formed by extruding the foamed material, reinforcing threads can be incorporated therein during or immediately subsequent to the formation of the foamed sheeting material and prior to the setting thereof. Alternatively, reinforcing threads can be formed directly in the foamed thermoplastics material itself using pressure and known dielectric or sonic fusion heating techniques to collapse lines of cells and fuse the material into continuous strands.

Applied to each face of the core 11 are one or more layers of fiber batting 13, which preferably are comprised of a carded web of acrylic, acrylic polyester of monoacrylic fibers, or admixtures thereof. Natural fibers also can be employed, such as wool, long staple cotton or flax, either alone or in combination with each other or in combination with synthetic fibers. In the carded web a multiplicity of the fibers will lie at an acute angle to each other in crossed relationship as a result of the carding operation, and the fibers will be oriented dominantly in a direction extending longitudinally of the carded web. If more than one layer of fiber is to be employed for each of the facings 13, it is preferable that the respective layers of fiber are lapped at crossing angles such that in the multiple layer facing a majority of the fibers retain their general orientation in a direction transverse to the lines of stitching 12.

By virtue of the excellent insulating properties of the cellular core 11, the respective facings 13 can be made of reduced weight and fiber density, and further, by virtue of the longitudinal stabilization provided by the stitching 12 and the transverse stabilization provided by the facings 13, the facings can be made extremely light weight with a fiber density suitable for a featherweight or summer weight blanket material.

After the respective facings 13 are positioned on the opposite faces of the foamed core 11, each facing is then needled through the core and into the opposite facing to produce an integrated laminate.

Figure 2:
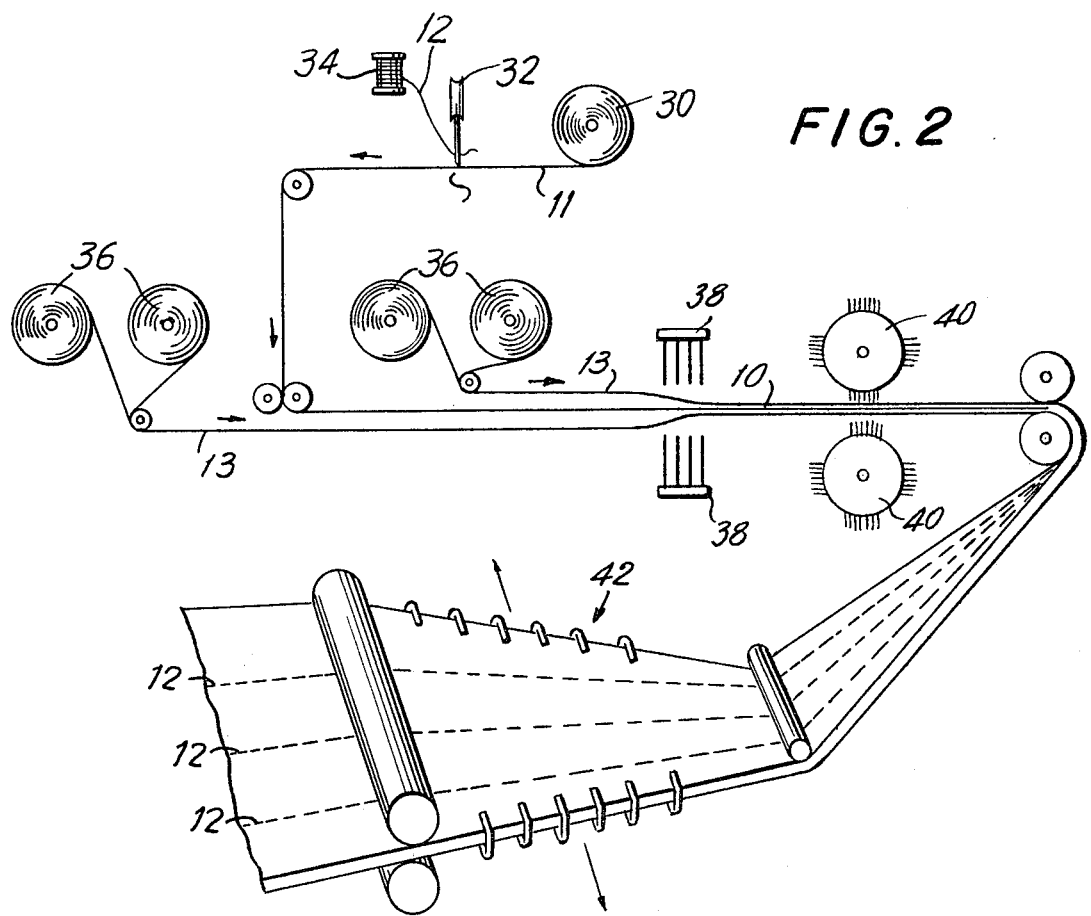
FIG. 2 is a diagrammatic illustration of a preferred production line for use in the manufacture of the non-woven fabric of the present invention.

FIG. 2 schematically illustrates an apparatus for use in the continuous manufacture of the laminated nonwoven fabric of the present invention. As shown, the cellular sheet material 11 is fed from a supply roll 30 in any conventional manner to a tandem needle chain-stitching machine 32, at which point the cellular sheet material is loosely chain stitched with multiple longitudinally extending rows of reinforcing threads 12 from supply spools 34. The stitched cellular sheet material then proceeds to a laminating bed and is interposed between layers of carded fiber batting 13. As illustrated, the carded fiber batting is supplied from rolls 36 thereof. In practice, the fiber battings are preferably continuously manufactured by a scrim-carding machine and continuously fed laterally to the laminating bed and lapped in a known manner. The individual fibers of the carded webs reach the laminating bed and are laid by the carding machine in the same longitudinal direction but in crossing relationship, the general direction of each of the individual fibers, or at least a majority thereof, being transverse to the direction of movement of the stitched core 11.

Subsequent to the assembly of the facings of batting fibers onto the opposite faces of the cellular core, the laminate is then fed through a needle loom 38 and is needled simultaneously from both sides thereof to produce the integrated nonwoven fabric 10.

Subsequent to the formation of the integrated laminate, and in any desired and convenient order, the exposed faces of the laminate facings 13 are then brushed, napped, or otherwise raised or processed to provide the desired surface finish using conventional devices for that purpose as indicated at 40.

Either prior to the surface finishing of the formed laminate, subsequent thereto, or intermediate to successive finishing steps, the fabric is tentered in a tentering device indicated at 42. In the tentering operation the fabric is stretched or tentered in a lateral direction to further bring the fibers in the respective facings 13 more closely into alignment with each other, causing the individual fibers to be even more closely aligned in a direction extending transversely of the reinforcement threads. In a fabric having a nominal width after the needling operation in the order of 88 to 86 inches, the fabric would be tentered to a standard 90 inch width, i.e., would be tentered to an extent producing an increase in width of the fabric in the range of 1 to 4.5 percent.

Subsequent to the tentering, the fabric may then be subjected to any further processing operations as are conventional in the art, such as printing, dyeing, heat-setting, lusterizing or the like in order to further improve the hand of the fabric and its aesthetic appearance.

A significant benefit accruing from the present invention is that thin spots which are known to occur in non-woven needle loomed fabric are either eliminated in their entirety, or are reduced in their undesirable effects to such an extent as to no longer be of commercial concern. Previously in non-woven needle loomed fabric where thin spots occurred, the interlocking of the fibers is of reduced integrity and inadequate interlocking of the fibers results. In launderings it has been found that the fibers in such thin spots detach from the fabric, ultimately resulting in holes in the fabric. The presence of the cellular core in the non-woven fabric of the present invention has the extremely beneficial effects of retaining and enhancing the integrity of the fabric, even in the presence of thin spots, and, eliminating for all practical purposes the problem of disintegration of the fabric at the thin spots. The cellular core provides a resilient substrate which frictionally restrains and interlocks with the fibers which extend therethrough, and which enhances the structural integrity of the fabric. It has been found that the fabric of the present invention accepts dyeing more evenly, and the printing of the finished fabric is greatly facilitated.

Figure 3:
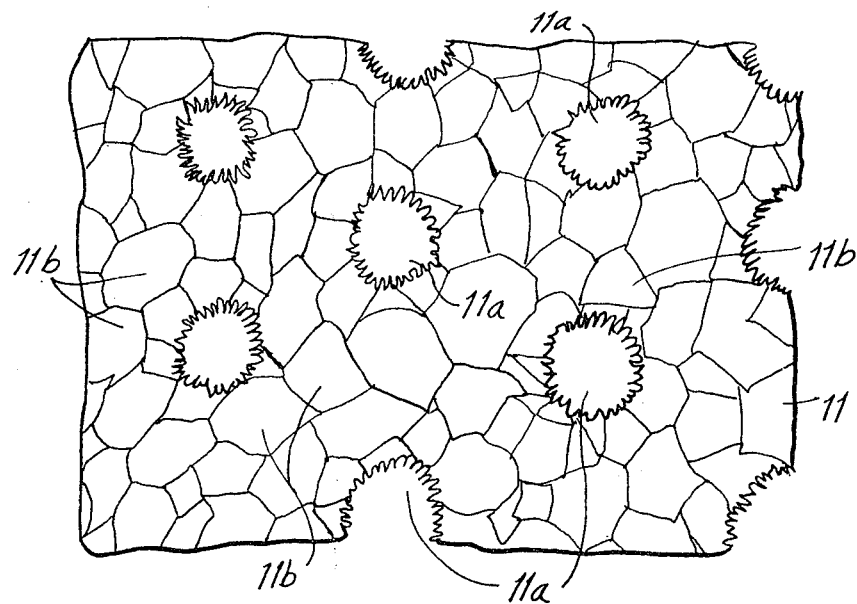
FIG. 3 is a greatly enlarged illustration, in plan view, of the core of the non-woven fabric of the present invention subsequent to it having been needled, the fibers not being shown for clarity.
Figure 4:
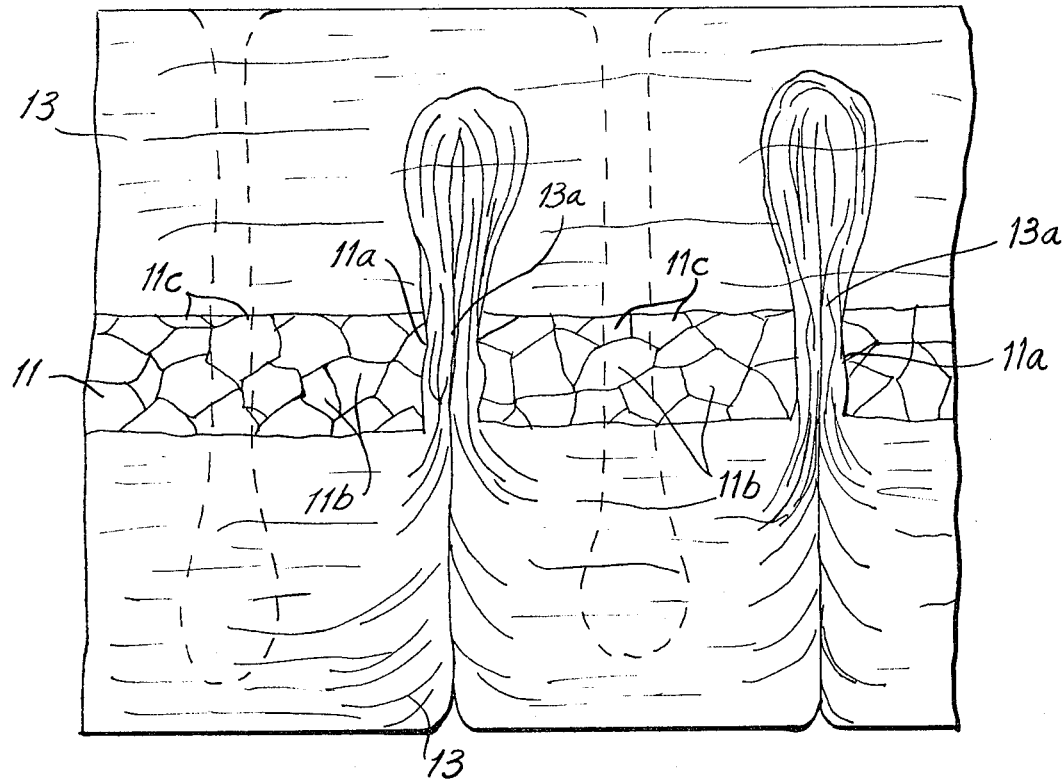
FIG. 4 is a greatly enlarged cross-sectional view through the finished non-woven fabric of FIG. 1.

FIGS. 3 and 4 of the drawings respectively diagrammatically illustrate the condition of the cellular core after the needling operation, and the depth of needling of the respective facings of the fabric.

In FIG. 3, the apertures 11a punched through the cellular core 11b by the needles of the needle loom result in the rupturing or piercing of the walls of those cells which are in the immediate vicinity of or underlying the point and barbs of respective needles. The remaining unbroken walls of the cells provide dead air pockets. The apertures 11a are simultaneously plugged with fibers drawn by the needles from that facing of the core on which the needles are operating, as illustrated in FIG. 4. The plugs 13a of fibers will not completely close the apertures 11a in the cellular core 11, but, upon withdrawal of the needle, will produce a multiplicity of air pervious wicks extending through the core, and which will provide for air and moisture ventilation between the opposite faces of the otherwise closed-cell and air impervious core. This is of particular importance where the core is formed from a hydrophobic material because the closed-cells of the core will not only inhibit the passage of air through the core, but also will inhibit the transmission of water vapor through the core.

It will be noted that numerous closed cells 11b are located intermediate to the puncture apertures and which have not been broken by the needling operation despite the formation of the cellular core by, for example, a peeling operation, which generally consists of shaving a lamella of the cellular material from a larger body thereof, and results in the cells at opposite faces of the cellular material being open by virtue of a portion of the cell wall having been cut away, the remaining walls of the cells being intact and impervious. Thus an impervious core is provided including closed cells admixed with cells which have been opened but which still function as honeycomb dead-air spaces. Such opened cells are indicated at 11c.

It has been found in practice that, for an identical weight of fabric per unit area, the incorporation into the fabric of a core of cellular material results in a significant decrease in the thermal transmittance ("U" value) of the fabric and a significant increase in insulation properties ("Clo" value) of the fabric. In a comparative test performed on two samples of identically formed non-woven fabric, one without the cellular core, and one with the cellular core of the present invention, it was found that the thermal transmittance ("U" value) was reduced from 0.891 Btu/hour/degrees F./square foot to 0.831 Btu/hour/degrees F./square foot, while at the same time the insulation properties (intrinsic "Clo" value) was increased from 1.275 to 1.366. Further decreases in the thermal transmittance and increases in the insulating properties of the fabric readily can be obtained by merely increasing the thickness of the cellular core without increasing the weight of the facings, any such increase in the weight of the cellular core itself being of little significance.

Further, and as is diagrammatically illustrated in FIG. 4 of the drawings, the resulting needled laminate is entirely free from surface excrescences or pimpling, the needling of the respective facings into the opposite facing having been terminated within the facing, thus leaving the outer surface of the opposite facing smooth and continuous, with the exception of the dimples formed therein by the needling operation. Such dimpling readily is masked by the nap raising operations, and tactilely is entirely inconsequential, in that such dimplings become filled or partially filled with napped fiber.

While the fabric of the present invention has been described with reference to identical opposite facings, each formed from needled fibrous batting material, it will be appreciated that in certain applications, for example, in garment facings or linings, it will not be necessary for the finished fabric to be "double-faced". In such applications, the non-exposed face can be formed of any convenient material, provided, of course, that the material will accept and hold the clumps of fibers punched into that face by the needling operation. Typically, a loosely bonded scrim, or, a facing of a cellular material having different characteristics could be substituted for the non-exposed face.

It will be understood that the above description is to be taken as an example of non-woven laminate fabrics falling within the scope of the appended claims and the manner in which they are to be formed, and that various modifications may be made without departing from the scope of the invention as now defined.

What is claimed is:

1. A laminated non-woven fabric having particular utility as a bedding blanket, comprised by:
    a core of flexible cellular sheet material;
    spaced rows of reinforcing elements incorporated into the core and dimensionally stabilizing the core against stretching in a first direction;
    first and second facings on opposite sides of said core, one of said facings being of fibrous sheet material;
    the fibers of said fibrous sheet material facing being partially embedded within the other facing sheet at the opposite side of the core;
    the fibers of said one said fibrous sheet material facing being oriented in a direction transverse to said rows of reinforcing elements, and dimensionally stabilizing the fabric in a direction transverse to said first direction.

2. The fabric of claim 1, in which said core is a sheet of cellular plastics material.

3. The fabric of claim 1, in which said core is a sheet of closed-cell cellular plastics material.

4. The fabric of claim 1, in which said rows of reinforcing elements extend longitudinally of the core.

5. The fabric of claim 1, in which said reinforcing elements extend longitudinally of the core is substantially straight lines.

6. The fabric of claim 1, in which said reinforcing elements are filaments incorporated into the core in rows which are spaced from each other.

7. The fabric of claim 1, in which said reinforcing elements are spaced rows of filaments bonded to at least one face of said core.

8. The fabric of claim 1, in which said reinforcing elements are spaced rows of filaments stitched through said core.

9. The fabric of claim 1, in which said facing of fibrous sheet material is a sheet of needled fiber batting.

10. The fabric of claim 1, in which each of said first and second facings is a sheet of needled fiber batting.

11. The fabric of claim 1, in which each of said first and second facings is a sheet of needled fiber batting, the fibers of each said facing being partially embedded within the fibers of the opposite facing sheet.

12. The fabric of claim 9, in which a dominant number of the fibers in said fibrous sheet material facing are oriented transversely of said first direction at acute angles relatively to each other.

13. The fabric of claim 11, in which each said first and second facing sheet includes a dominant number of fibers oriented transversely of said first direction at acute angles relatively to each other.

14. A method of manufacturing a laminated non-woven fabric having particular utility as a bedding blanket, comprising the steps of:
    incorporating spaced rows of reinforcing elements into a core of flexible cellular sheet material;
    orienting a facing of fibrous batting material on at least one side of said core with the fibers of the batting extending transversely of said rows of reinforcing elements; and,
    embedding selected groups of fibers of said facing sheet within a facing sheet at the opposite side of said core.

15. The method of claim 14, including the steps of incorporating said spaced rows of reinforcing elements into said core by stitching said flexible cellular sheet material with spaced rows of filaments.

16. The method of claim 15, in which said stitching is chain stitching.

17. The method of claim 14, including the steps of orienting facings of fibrous batting material on both sides of said core, feeding the laminate thus formed to a needle loom, and needling fibers from each of said facings through said core and partially into the opposite said facing without extending beyond the respective outer facing.

18. The method of claim 19, including the steps of subsequently tentering the formed needled laminate in a direction transverse to said rows of reinforcing elements, to further orient the fibers in said facings and dimensionally stabilize said formed needled laminate against stretching in a direction transverse to said reinforcing elements.

* * * * *